Figure 1:
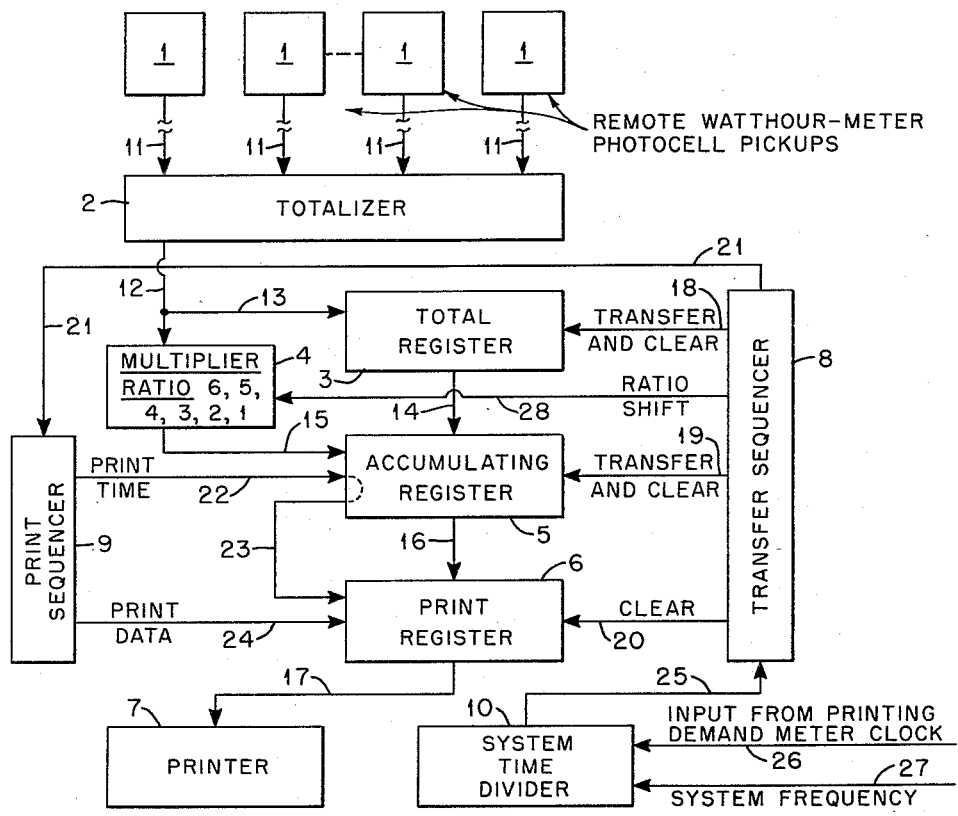

Sept. 5, 1961                J. V. WERME                2,998,917
ELECTRICAL LOAD ANTICIPATOR AND RECORDER
Filed June 1, 1959

A = 0 – 5 MIN. INTERVAL
B = 5 –10 MIN. INTERVAL
C = 10 –15 MIN. INTERVAL
D = 15 –20 MIN. INTERVAL
E = 20 –25 MIN. INTERVAL
F = 25 –30 MIN. INTERVAL

INVENTOR.
John V. Werme
BY
Roland G. Anderson
ATTORNEY

United States Patent Office 2,998,917
Patented Sept. 5, 1961

2,998,917
ELECTRICAL LOAD ANTICIPATOR
AND RECORDER
John V. Werme, Painesville, Ohio, assignor to the United States of America as represented by the United States Atomic Energy Commission
Filed June 1, 1959, Ser. No. 817,424
3 Claims. (Cl. 235—151)

This invention relates to an improved electrical load anticipator and recorder, and is an improvement over the system set forth in application Serial No. 817,425, filed June 1, 1959.

In a typical revenue-metering circuit system for measuring an electrical load, a number of polyphase watthour meters are employed. Each of these meters is connected into one of the transmission lines supplying power to the system. Associated with each of these watthour meters is a printing demand meter. The shaft of each watthour meter is provided with a cam-and-switch arrangement whereby an electrical impulse is fed into its associated demand recorder each time the meter shaft rotates through an angular distance corresponding to some unit, say one megawatt-hour, of load. The so-called "impulse value" for the system is, therefore, one megawatt. At the end of a pre-selected demand interval, the demand recorder totalizes the impulses received during the interval.

The system referred to above is subject to at least three disadvantages, each of which becomes increasingly objectionable with the size of the load being metered. One of these disadvantages relates to load "carry-over." Carry-over refers to electrical energy which is used during a given demand interval but which is not registered on the printing demand recorder until the succeeding demand interval. Carry-over occurs whenever the watthour meter is "between impulses" at the moment that the demand interval ends. One reason that carry-over is objectionable is that demand charges are based on the interval of maximum demand.

Another disadvantage is that whenever the printing demand recorder is electrically reset it is subject to losing any electrical impulses during the reset interval. This action coupled with the "carry-over" action can give a maximum deviation of ±1 megawatt for each line.

A third disadvantage of the aforementioned system is that during a demand interval the power dispatcher cannot determine the prevailing energy consumptions nor does the system include means for indicating, during a given demand interval, what the demand for the entire interval would be if energy consumption were to continue at the prevailing rate. A more precise knowledge of these two factors—the prevailing energy consumption, and to projected power demand—would enable the power dispatcher to hold the system load closer to 100% load factor. It will be apparent that any loss of impulses or carry-over will interfere with efforts to maintain the load factor at maximum.

With a knowledge of the shortcomings of prior revenue-metering systems, it is a primary object of this invention to provide a system in which load "carry-over" from one demand interval to the next is reduced, and loss of impulses is eliminated.

It is another object of this invention to provide a system in which an indication of the prevailing energy consumption in a power metering system and a projected power demand for one demand interval is provided at selected increments of time within the demand interval.

It is still another object of this invention to provide a revenue metering system in which a minimum of mechanical contacts and mechanisms are employed.

Figure 2:
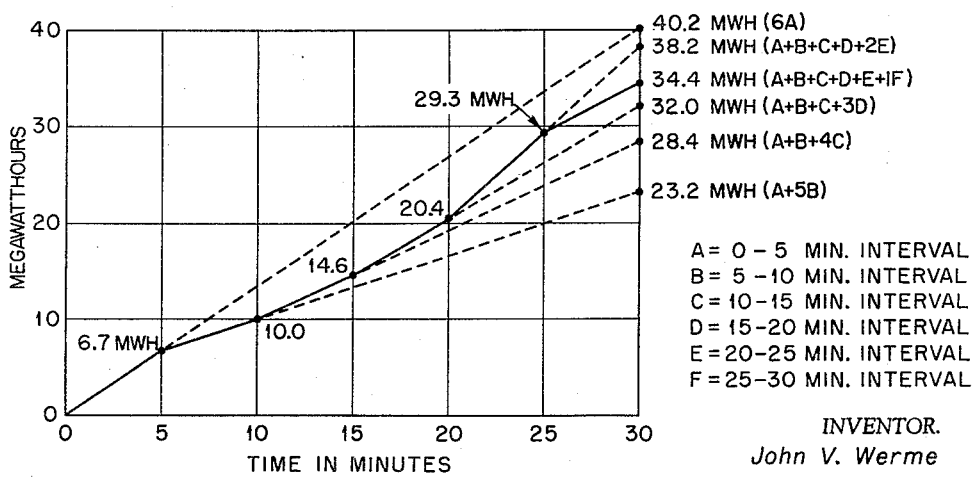

These and other objects and advantages of this invention will become apparent from a consideration of the following detailed specification and the accompanying drawings, wherein:

FIG. 1 shows a block diagram of a power load anticipator and recording system which illustrates one embodiment of the principles of this invention, and FIG. 2 shows a graph demonstrating the extrapolation principle of the system of FIG. 1.

The above objects have been accomplished in the present invention by utilizing a photoelectric impulse generator or magnetic type impulse generator, if desired, for each watthour meter in such a manner that two impulses are generated for each revolution of the meter disc thus greatly reducing the amount of carry-over. In each demand interval, for example, one half-hour, of the metering system, the total impulses received from all the meters are continuously totaled for each 5-minute interval, and multiplied by a number from 6 to 1 depending upon which 5-minute interval the impulses were received and this value is added to the total pulses received in the interval or intervals preceding the current 5-minute interval within the half-hour demand interval to thereby give an indication of the projected power demand every 5 minutes in the demand interval.

Reference is made to a half-hour demand interval for the system disclosed herein. It should be understood that the system may be modified to operate for any desired demand interval and is not limited to a specific half-hour demand interval, or to specific sub-intervals within a demand interval.

Refer now to FIG. 1, which illustrates an embodiment in which the principles of this invention may be carried out. A plurality of remote watthour-meter photocell pickups 1 are connected by lines 11 to a totalizer 2. The photocell pickups generate square waves which are amplified by means, not shown, and transmitted over twisted pairs to totalizer 2. The totalizer 2 then converts the square waves from pickups 1 into compatible pulses still in random or real time. The totalizer then serializes or converts the random entry of the pulses to serial entry in synchronism with the "clock frequency" of the system. Next, the pulses are corrected so that each pulse which is worth .112 megawatt-hour, is corrected finally be equal to .1 megawatt-hour per pulse. As shown in the block diagram, the net pulses of .1 megawatt-hour each are entered into the total register 3 by lines 12 and 13 from totalizer 2, and into multiplier 4 by line 12 from totalizer 2. Into register 3 flows the net total of pulses being accumulated during the half hour, and into an accumulating or extrapolating register 5 flows the same impulses multiplied by a constant—any whole number from 6 to 1, depending upon the five-minute period in which pulses are being counted. The register 5 is connected to multiplier 4 by a line 15.

Starting at time zero (the beginning of a half-hour period), the total number of pulses received during the first five-minute interval is counted in the total register 3, and six times the number of pulses are counted in the accumulating register 5. Thus the amount shown in the accumulating register is indicative of the amount that will be used at the end of the half-hour if the present rate of power usage is maintained. At the end of the first five minutes a signal from the system time divider 10 starts the transfer sequencer 8 operating. The system time divider is connected to the transfer sequencer by a line 25. Real time from system frequency is entered into the system time divider 10 by a line 27 to obtain the increments of time necessary upon which to base the computation of forecasted power. Entering also to the system time divider is an input on line 26 from the printing demand meter clock to synchronize the "real time" clock of the system with that of the demand meters. This consists of a pulse once each half-hour.

The system time divider 10 emits a signal each five minutes. At the end of the first five minutes, the first signal emitted by the system time divider causes the transfer sequencer to commence operating. The transfer sequencer 8 is connected by a transfer and clear line 18 to the total register 3, by a ratio shift line 28 to the multiplier 4, by a transfer and clear line 19 to the accumulating register 5, and by a clear line 20 to the print register 6. The total register 3 is connected by a line 14 to the accumulating register 5 which in turn is connected by a line 16 to the print register 6, which in turn is connected by a line 17 to a printer 7. The transfer sequencer is also connected by a line 21 to a print sequencer 9. Print sequencer 9 is connected by a print time line 22 to the accumulating register 5, by print time lines 22 and 23 to print register 6, and by a print data line 24 to print register 6.

During the first five-minute interval for example, the incoming pulses being totalized are multiplied by 6 by the multiplier 4 and then entered into accumulating register 5. After the sequencer 8 begins operating, after the first five minutes, the first function it performs is to clear the print register. Then the amount stored in the accumulating register is transferred to the print register, remembering that if the system were operating in the first five-minute interval of a half-hour, it had 6 times the energy consumed stored in the accumulating register. The accumulating register is then cleared, the amount stored in the total register is transferred to the accumulating register, and the multiplier ratio constant is changed. The total register is cleared only at the end of each half-hour, not at the end of each five-minute interval as is the print register and accumulating register. Having transferred from the accumulating register into the print register and form the total register into the accumulating register, the total register and accumulating register are again ready to receive data from the totalizer. The data is entering the two registers in synchronism with the 64th sub-multiple of the basic "computer clock frequency." The time required for the complete transferring and clearing of the accumulating and total registers is about one-half of the time between two pulses of this 64th sub-multiple and is started ten clock pulses after the 64th sub-multiple pulse. Therefore all transferring and clearing is done between data entries losing no data in the process. The sequence control proceeds to print the amount shown in the print-out register. Meanwhile, a new computing period has begun with the amount now stored in the accumulating register being equal to the amount in the total register at the end of the first five minutes. However, the multiplier constant is now changed to 5 so that at ten minutes from time zero there will be accumulated in the accumulating register an amount equal to the megawatt-hours at the end of the first five minutes plus five times the amount which has accumulated in the second five-minute interval. This means that if the present rate is continued for the remaining part of the half-hour, the amount shown in the accumulating register would be the amount used at the end of the half-hour. At the end of the second five-minute interval, a signal again commands the sequencer to transfer and print out as before. During the third period, in which the multiplier constant is four, the accumulating register starts with the amount in the total register at the end of ten minutes, and receives and adds to this the amount received by the multiplier during the third period multiplied by four. At the end of the 15-minute interval, therefore, in the accumulating register will be the amount of megawatt-hours which would be used in a half-hour at the current rate. The process is repeated at the 20 minute and 25 minute mark with multiplying constants of three and two, respectively.

At the end of 30 minutes, a signal from an external printometer clock, not shown, causes equipment to operate which clears all the registers and commences again from zero. During the last five-minute period the accumulating register started with the 25 minute total from the total register and added to it one times the amount received from the multiplier. Therefore, the accumulating register had in it the total number of megawatt-hours at the end of a half-hour and thus this value was printed out at the end of the half-hour.

The transfer sequencer 8 emits a signal into the print sequencer 9 every five minutes, which in turn controls the print register 6. The first function of the print sequencer is to pick up time from the accumulating register indicating in which five minute interval the system is operating and enters this into the data printer. Next, the data is picked up from the print register by said print sequencer and entered into the data printer. The final function of the print sequencer is to operate the print command, to print the predicted energy consumption of the one-half hour interval, based on accumulated total and present rate of consumption.

Five minute calculating increments were chosen so that during the one-half hour interval, the operator will have five opportunities of altering the load schedule in a manner so as to approach the 100% load factor, that is, at five minutes, ten minutes, fifteen minutes, etc. The data printed by the above system is actually a predicted value, the calculation of which is based on the energy consumed up until the time the value is printed and the rate of consumption for the five minutes prior to the printing of any specific prediction.

FIG. 2 shows a graph demonstrating the extrapolation principle used in the system of FIG. 1. Starting at time zero, the energy consumed is totalized for the next five minutes. At the end of the five minute interval, the totalizer amount is multiplied by 6, thus giving an estimated or predicted energy consumption for a one-half hour interval—40.2 megawatt-hours, as shown on the graph. During the next five minute interval, energy consumption is again totalized. This value is multiplied by 5 and added to the first five minute interval total, thus giving a new and more accurate predicted value for the end of the half-hour interval. On the graph this is indicated as 23.2 megawatt-hours. The process is continued until at the end of 25 minutes, energy consumption from 25 minutes until 30 minutes is summated, multiplied by one, and added to the first 25 minutes total of energy consumption. The result is the total energy consumed in the half hour period or 34.4 megawatt-hours, as shown on the graph. The above values, as shown on the graph, are given by way of an example only, it being understood that the principles involved are equally applicable to any size power load being metered.

Another feature of the system set forth in FIG. 1 is that the output of the equipment can be used to drive a digital-to-analog controller, not shown, to automatically vary the load on the power system and thus provide essentially a continuous 100% load factor to the system.

There are two basic sensor units provided for the watt-hour meters. One of these is for use on meters capable of rotating in one direction only, and the other is for use on meters measuring the power on lines which carry their power in either direction. Amplifiers are provided for both types of sensor units. The two-way sensor unit employs two phototubes which provide signals, that are amplified by the amplifier connected to this sensor, which are about 15° out of phase. Which signal leads, of course, is dependent upon the direction of disc rotation in the meter. In the totalizer which receives these signals, a phase sensitive logic circuit is employed to determine whether the rotation is positive or negative. Means are provided in the totalizer which provides a net total of positive power pulses accumulated each five minute interval within the half-hour demand interval from all the meters in the system.

The system of FIG. 1 employs static and dynamic logic circuitry. All of the logic circuits except the input and output circuits are assembled using magnetic core transistor logic elements. These elements are used for various basic circuits used in the system. Among these are the flip-flop, the shift register, the binary counter, the binary demical counter, etc. Such circuits are well known in the art and no detailed discussion of them is considered necessary. It can be readily seen that the use of such circuits eliminates the use of mechanical counters, mechanical contacts and related components which are subject to wear and other limitations.

In the system of FIG. 1, the predicted power consumption is recorded, in terms of megawatt-hours. It should be understood that the system may be modified to record any increment of power representing energy, i.e., kilowatt-hours, and watthours.

This invention has been described by way of illustration rather than limitation, and it should be apparent that the invention is equally applicable in fields other than those described.

What is claimed is:

1. A power load anticipator and recording system for a plurality of power lines and for a preselected power demand interval, comprising a watthour meter connected in each power line, an impulse generator associated with, and actuated by, each meter to provide an output proportional to the energy used on each line, a totalizer having a plurality of input lines and a single output line, means connecting the outputs of said impulse generators to the input lines of said totalizer, a total register, a multiplier provided with a plurality of selectable multiplier constants, one each for a plurality of equal demand sub-intervals, an accumulating register, means connecting the output line of said totalizer to said total register and to said multiplier, means connecting said multiplier to said accumulating register, means connecting said total register to said accumulating register, said total register including means for storing information received from said totalizer for said power demand interval, means connected to said accumulating register for periodically printing out information stored therein at the end of each of said equal demand sub-intervals, sequencing means connected to said total register, to said multiplier, and to said accumulating register and controlling, in sequence, the printing out of information stored in said accumulating register, the clearing of said accumulating register, the transferring of information stored in said total register to said accumulating register, and the changing of the multiplier constant of said multiplier at the end of each of said demand sub-intervals, said accumulating register's output at the end of each demand sub-interval representing the sum of the amount of energy already used during said demand interval, as derived from said total register, plus a projected power demand for the remainder of the demand interval, said projected demand being the power used during the instant demand sub-interval times the selected multiplier constant for said sub-interval, said sequencing means including means for clearing said total register and resetting said multiplier at the end of said demand interval to thereby begin a new demand interval.

2. The system set forth in claim 1, wherein said printing out means includes a print register and a printer, said sequencing means including means for clearing said print register, transferring information stored in said accumulating register to said print register, and printing-out information in said print register at the end of each demand sub-interval.

3. A power load anticipator and recording system for a plurality of power lines and for a preselected power demand interval, comprising a watthour meter connected in each power line, an impulse generator associated with and actuated by each meter to provide an output proportional to the energy used on each line, a totalizer having a plurality of input lines and a single output, means connecting the outputs of said impulse generators to the input lines of said totalizer, a total register, an accumulating register, a print register, and a printer, means connecting the output of said total register to said accumulating register, means connecting the output of said accumulating register to said print register, means connecting the output of said print register to said printer, a multiplier provided with a plurality of selectable multiplier constants, one each for a plurality of equal demand sub-intervals, means connecting the output from said totalizer to said total register and to said multiplier, said total register including means for storing information received from said totalizer for said power demand interval, a transfer sequencer, a timing circuit, said timing circuit connected to and providing a control signal to said transfer sequencer at the end of each of said equal demand sub-intervals, a print sequencer, said transfer sequencer connected to each of said print register, accumulating register, total register, multiplier, and print sequencer to provide control signals thereto at the end of each of said equal demand sub-intervals, means for feeding the output of said multiplier to said accumulating register, said control signals from said transfer sequencer sequentially clearing said print register, transferring the information stored in said accumulating register to said print register, clearing said accumulating register, transferring the information stored in said total register to said accumulating register, changing the multiplier constant of said multiplier, and initiating operation of said print sequencer at the end of each of said demand sub-intervals, said print sequencer being connected to said accumulating register and said print register, said print sequencer, after it is rendered operative by said control signal from said transfer sequencer, sequentially picking up the time sub-interval information from said accumulating register and transferring this information to said print register, then transferring all the information in the print register to said printer, and finally causing said printer to print out, said accumulating register's output at the end of each equal demand sub-interval representing the sum of the amount of energy already used during said demand interval, as derived from said total register, plus a projected power demand for the remainder of the demand interval, said projected demand being the power used during the instant demand sub-interval times the selected multiplier constant for said sub-interval, said sequencing means including means for clearing all of said registers and resetting said multiplier at the end of said demand interval such that said system is ready to begin a new demand interval.

References Cited in the file of this patent
UNITED STATES PATENTS
2,678,163     Roberts et al. _____ May 11, 1954